(12) United States Patent
Gambino

(10) Patent No.: US 8,726,316 B2
(45) Date of Patent: May 13, 2014

(54) COMPUTER-IMPLEMENTED SYSTEM AND METHOD FOR OBTAINING GOODS AND SERVICES SHOWN IN TELEVISION AND MOVIES

(76) Inventor: Darius C. Gambino, Springfield, PA (US)

( * ) Notice: Subject to any disclaimer, the term of this patent is extended or adjusted under 35 U.S.C. 154(b) by 238 days.

(21) Appl. No.: 13/044,185

(22) Filed: Mar. 9, 2011

(65) Prior Publication Data

US 2012/0233641 A1 Sep. 13, 2012

(51) Int. Cl.
*H04N 5/445* (2011.01)

(52) U.S. Cl.
USPC ............................................ 725/60; 709/231

(58) Field of Classification Search
USPC .............................. 725/37–61; 709/219–232
See application file for complete search history.

(56) References Cited

U.S. PATENT DOCUMENTS

| | | | |
|---|---|---|---|
| 6,184,877 B1 * | 2/2001 | Dodson et al. ................. | 725/110 |
| 7,493,636 B2 * | 2/2009 | Kitsukawa et al. ............. | 725/23 |
| 8,010,537 B2 * | 8/2011 | Prasad Kantamneni et al. ............................. | 707/748 |
| 8,205,230 B2 * | 6/2012 | Gossweiler et al. ............ | 725/39 |
| 8,306,969 B2 * | 11/2012 | Beaudreau ..................... | 707/722 |
| 8,498,999 B1 * | 7/2013 | Bhalotia ........................ | 707/767 |
| 8,612,431 B2 * | 12/2013 | Busch et al. ................... | 707/730 |
| 8,655,872 B2 * | 2/2014 | Kraft ............................. | 707/723 |

* cited by examiner

*Primary Examiner* — Annan Shang
(74) *Attorney, Agent, or Firm* — DLA Piper LLP (US)

(57) ABSTRACT

A system and method for obtaining goods and services shown in television and movie programs including at least one server computer and at least one client computer coupled to the at least one server computer through a network to perform the steps of receiving a first search parameter from a user stationed at the at least one client computer, receiving a second search parameter from the user, calculating a search result based on the first and second search parameters, determining if a single television or movie program is specified by the search result, permitting the selection of at least one scene with the television or movie program, if a single television or movie program is specified by the search result, permitting the selection of at least one product or service within the at least one scene, and directing the user to a webpage or website including specific purchasing information for the at least one product or service. The system and method thus permits a user to determine the products and services shown on television and movie programs, and purchase such products and services directly.

15 Claims, 10 Drawing Sheets

COMPUTER-IMPLEMENTED SYSTEM AND METHOD FOR OBTAINING GOODS AND SERVICES SHOWN IN TELEVISION AND MOVIES

FIELD OF THE INVENTION

The present invention relates generally to a system and method for obtaining goods and services shown in television and movies. In particular, the present invention relates to a system and method whereby a television or movie viewer can go to a centralized website, search for a particular television show or movie, find the goods or services shown in such television show or movie, and be directed to another webpage or website to purchase such goods or services.

BACKGROUND

The placement of specific goods and services within television and movie programs has become increasingly more popular. In fact, manufacturers often vie for the right to have their products featured in a television show or movie. For example, Ford® and BMW® may vie for the right to provide all the cars used by the main characters in a particular movie. Similarly, Coke® and Pepsi® may vie for the right to have their products shown exclusively on a television show. However, there are presently few means for a television or movie viewer to directly obtain the goods or services shown on such television and movie programs.

The entertainment magazine Entertainment Weekly has periodically included a section entitled "Where'd They Get That?" which informs viewers as where they can obtain certain items worn by characters in television and movies. A similar blog website also exists (http://wheredtheygetthat.blogspot.com) which provides information on specific clothing worn by celebrities both within television shows and movies, and in public. Another example is the website SeenOn (www.seenon.com) which provides members the opportunity to purchase specific products shown on television and movies.

The website BrandChannel (www.brandchannel.com) tracks how and when specific brands appear in television shows and movies. They have a specific sub-section of the site entitled "Brand Cameo" where the authors list specific brands and how many times each has appeared in a movie in a particular year.

The phenomena of brands appearing in televisions shows and movies is often referred to as product placement or embedded marketing, and it became popular in the 1980s (http://en.wikipedia.org/wiki/Product_placement). The pervasiveness of brands in the entertainment industry has only increased since then, and now many companies seek out movie and television producers to have their products placed exclusively in a particular show or movie. For example, the film "The Matrix" used Cadillac® automobiles exclusively for all the major character vehicles, and the film "Transformers" used exclusively Chevrolet® vehicles. In a 2009 article, Business Week reported on the fifteen (15) television shows which had the highest number of product placements (http://images.businessweek.com/ss/09/04/0423_tv_product placements/1.htm). The list included reality shows like The Biggest Loser, Extreme Makeover: Home Edition and American Idol, and fictional shows like One Tree Hill and The Office.

One perceived deficiency with the above-referenced websites and services is that they are limited in scope, and only include such goods and services that the business owners choose to show, or that the brand owners have pre-arranged to highlight. In the case of Entertainment Weekly's magazine, the publisher selects one specific item from four to five programs. With regard to the website SeenOn, they select specific items from specific programs (and in particular items from manufacturers with which they have established relationships). If the viewer has no interest in the programs selected by these services, or in the items selected, there are of little use. Further, although SeenOn apparently permits members to buy goods directly from their website, viewers referencing the Entertainment Weekly magazine feature would still need to seek out a website or store from which to purchase the goods.

There are issues with product placements as well. In that setting, the brand owner makes a well-known brand (e.g., Apple®, Chevrolet®, etc.) visible within a television show or movie, such that the buyer can easily identify the brand. However, the buyer may not be able to identify the specific product. The buyer may know, for example, that the main character was using an Apple® computer, but they don't know which one, or that the main character was wearing Ray-ban® sunglass, but not the specific model number. Showing brands excessively within a television show or movie (such that the buyer can recognize them) may also not be desirable in certain circumstances. For example, showing a close up of the brand of guitar a character is playing (just so the buyer can identify it) may detract from the story or visual impression desired by the director.

The present invention seeks to address the above-referenced problems through the creation of a centralized website which allows viewers the flexibility to search for television or movie programs, and select the specific goods and services shown in a particular scene.

DETAILED DESCRIPTION

The present invention relates to a system and method for obtaining goods and services shown in television and movies. In particular, the present invention relates to a system and method whereby a television or movie viewer can go to a centralized website, search for a particular television show or movie, find the goods or services shown in such television show or movie, and be directed to another webpage or website to purchase such goods or services. In the exemplary embodiment shown in the attached drawings, the centralized website may include hyperlinks embedded in one or more video files which direct the user to the webpage or website where the goods or services may be purchased.

Figure 1:
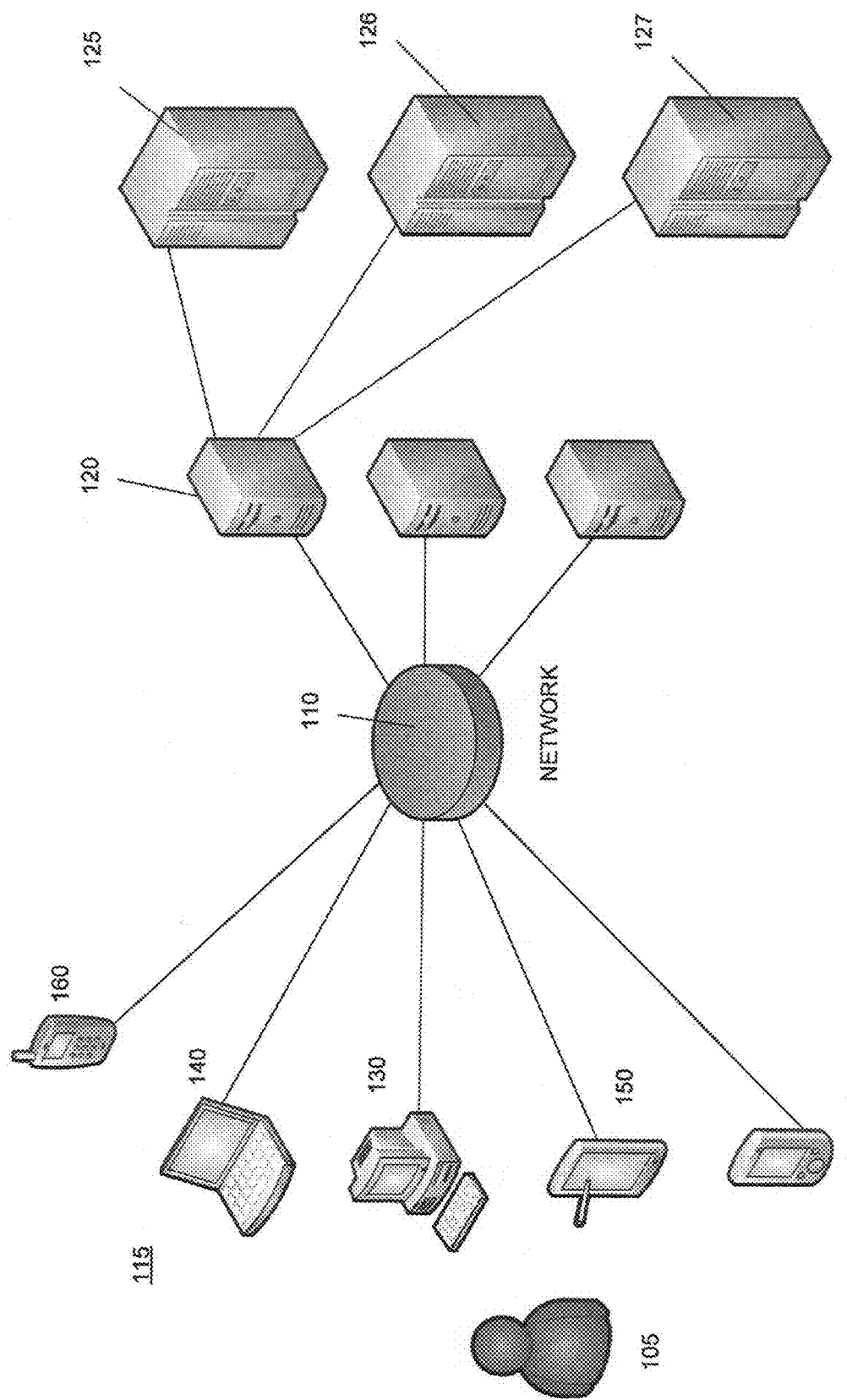
FIG. 1 is a schematic diagram of a computer system according an exemplary embodiment of the present invention.

FIG. 1 shows a computer system 100 according to an exemplary embodiment of the present invention. The computer system 100 includes one or more server computers 120 which are connected to various user devices 115 over a network 110, such as the Internet. The user devices may be operated by a user 105 and may comprise a desktop computer 130, a laptop computer 140, a tablet computer 150 (e.g., Apple iPad, Motorola Xoom, Samsung Galaxy Tab, etc.), a Smart Phone 160 (e.g., Apple iPhone, Blackberry Phone, Android Phone, etc.), and a Personal Digital Assistant (PDA) 170. The user devices 115 and server computers 120 may be connected to the network 110 by various means such as Local Area Network (LAN), Wide Area Network (WAN), cable modem, digital subscriber line (DSL), wireless networks (e.g., 3G or 4G networks), or other equivalent connection means.

Each user device 115 preferably includes a video screen for displaying images and other information, as is well known in the art. Additionally, each user device 115 preferably includes an electronic mail (e-mail) program (e.g., Microsoft Outlook®) and a browser program (e.g. Microsoft Internet Explorer®, Netscape Navigator®, etc.), as is well known in the art.

One or more of the server computers 120 preferably include at least one program module (explained in detail below) that allows the user devices 115 to communicate with the server computer over the network 110. The program module may include program code, preferably written in Hypertext Mark-up Language (HTML), JAVA™ (Sun Microsystems, Inc.), Active Server Pages (ASP) and/or Extensible Markup Language (XML), which allows the user devices 115 to access the program module through browsers (i.e., by entering a proper Uniform Resource Locator (URL) address), or through stand-alone applications running on the devices (e.g., Application programs ('Apps') running on Apple iPhone, Blackberry Phone, or Android Phone). The exemplary program module also preferably includes program code for permitting the user 105 to operate one or more of the user devices 115 to access a directory of television and movie programs (which include links to goods and/or services), so as to locate and purchase goods and services shown on such programs, as explained in detail below.

At least one of the server computers 120 may be coupled to one or more databases 125, 126, 127 for storing information (e.g., information on television and move programs, information on goods and services shown on such programs, etc.) utilized by the program module in order to carry out the method for obtaining goods and services described below. The database may be internal to one or more of the server computers 120, or may comprise an external databases 125, 126, 127 as shown in FIG. 1. For example, database 125 may hold program information for various television and movie programs, such as copies of the programs (e.g., in ".m4v," ".mov," or other format known to those of ordinary skill in the art) which may be searched. Similarly, database 127 may hold information on various products and services included within such television and movie programs, and database 126 may comprise a cross-reference database which assists in establishing connections between the television and movie programs and the products and services included therein.

Figure 2:
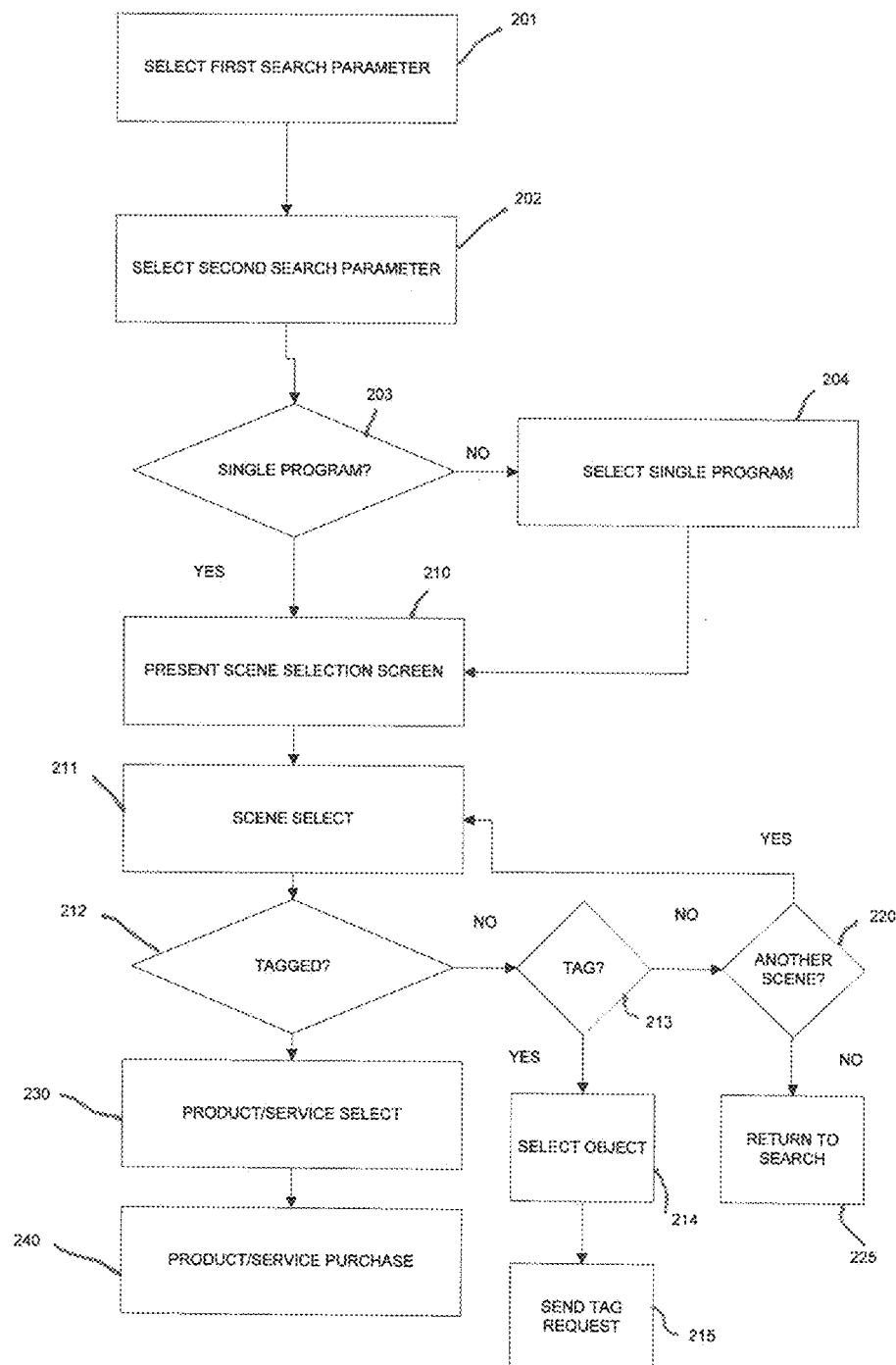
FIG. 2 is a flow diagram showing a method for obtaining goods and services according to an exemplary embodiment of the present invention.
Figure 3:
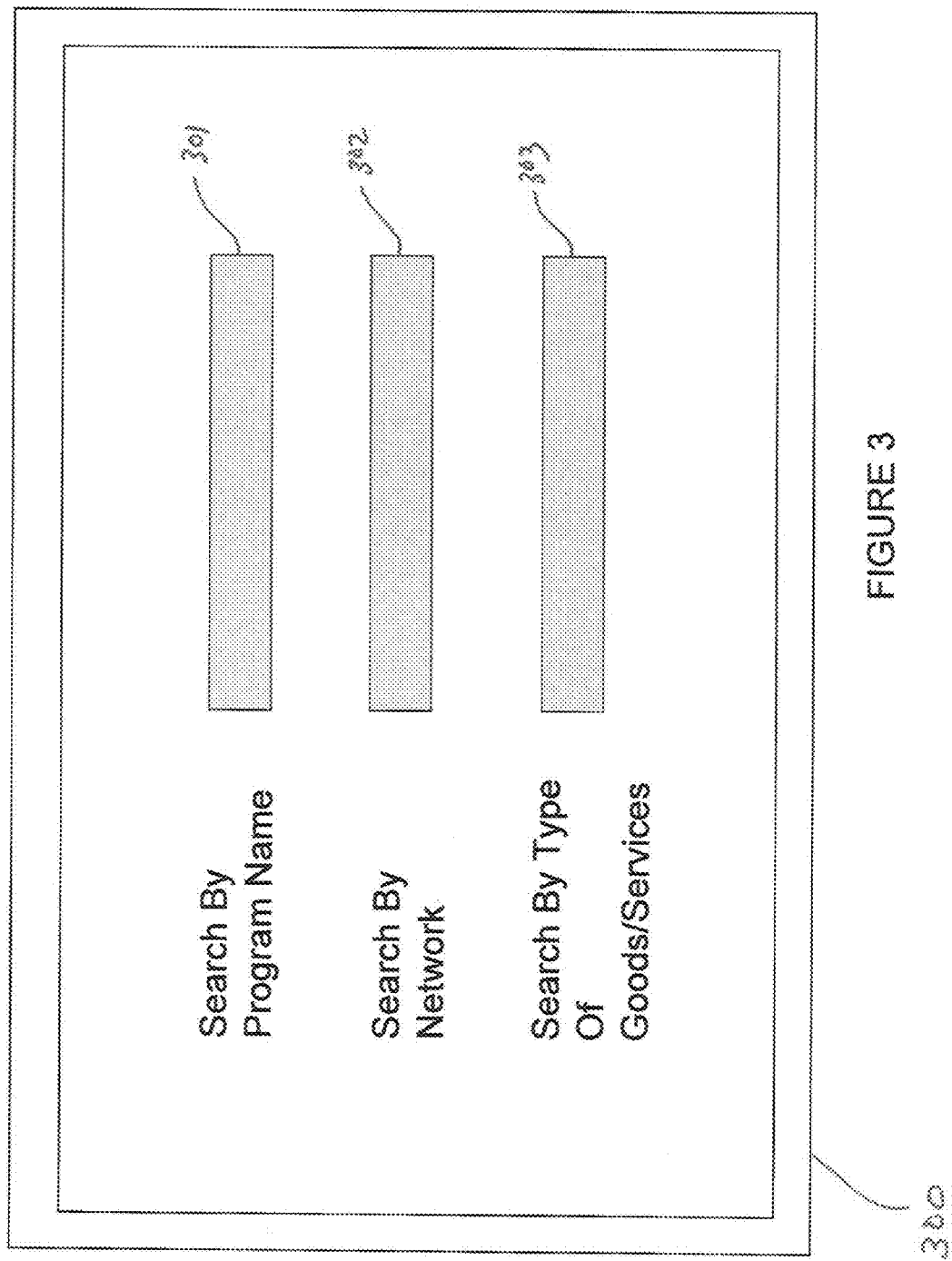
FIG. 3 shows a main search screen display according to an exemplary embodiment of the present invention.
Figure 4:
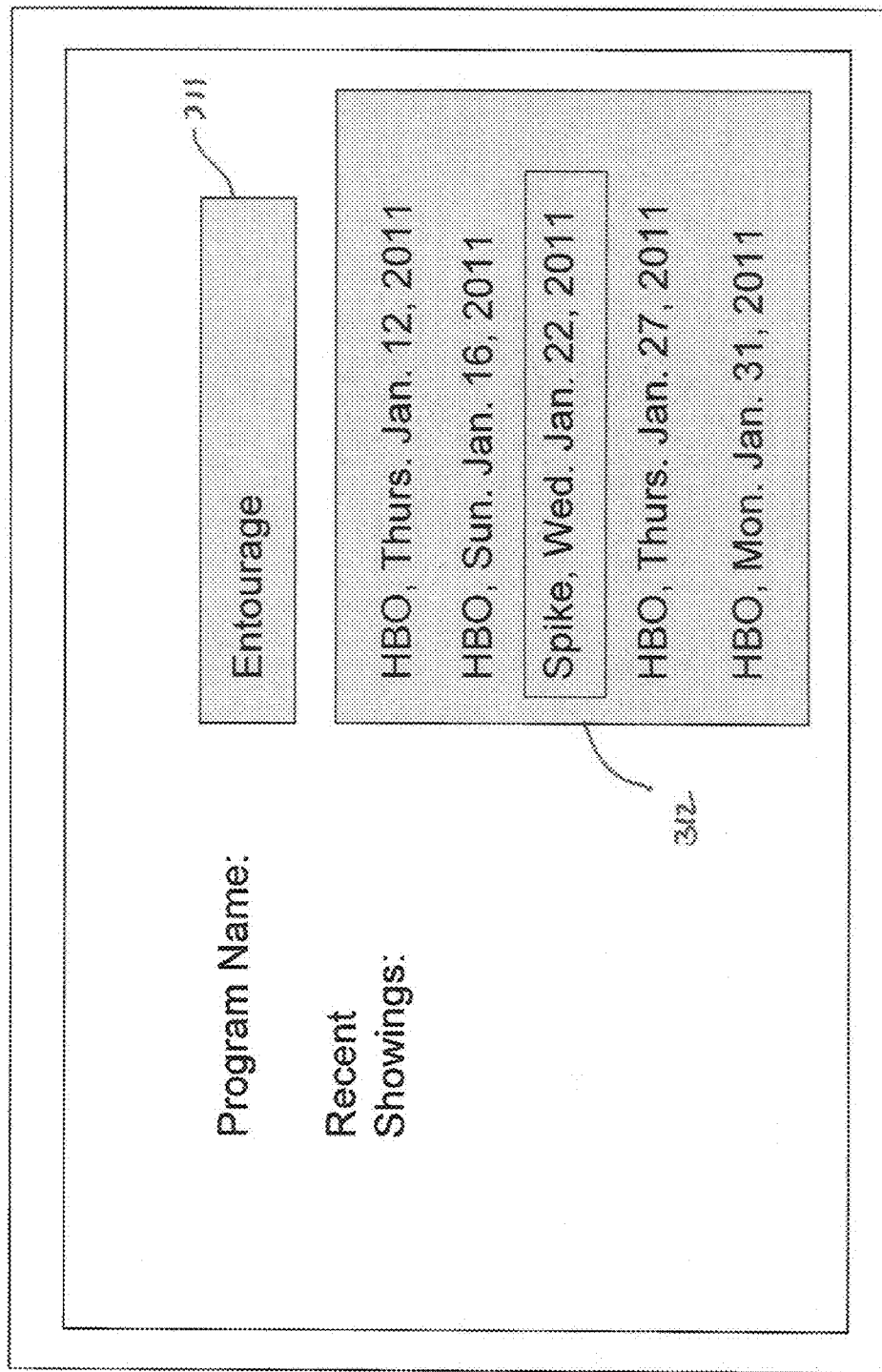
FIG. 4 shows a shows a search-by-program results screen display for television according to an exemplary embodiment of the present invention.
Figure 5:
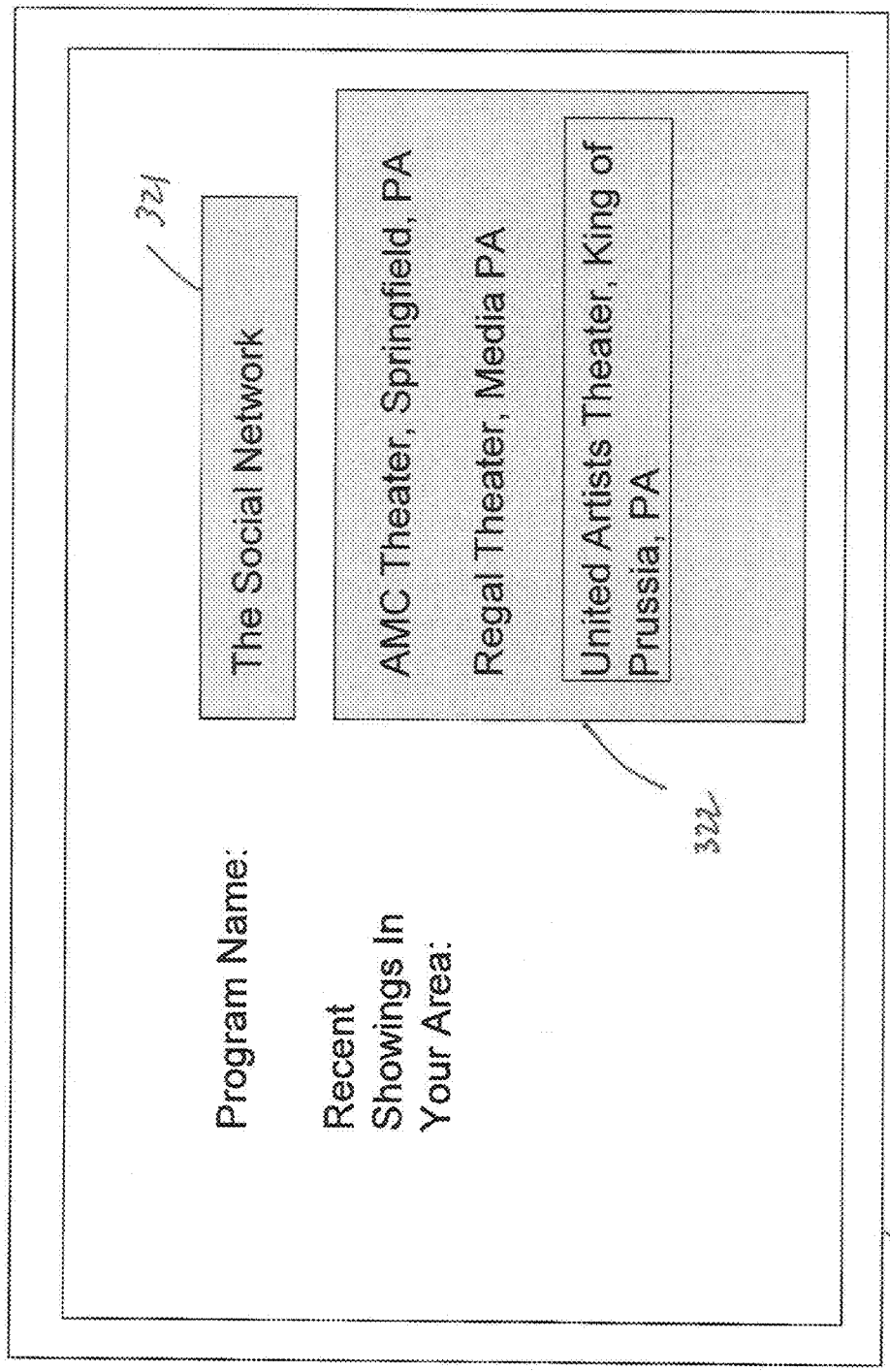
FIG. 5 shows a shows a search-by-program results screen display for movies according to an exemplary embodiment of the present invention.
Figure 6:
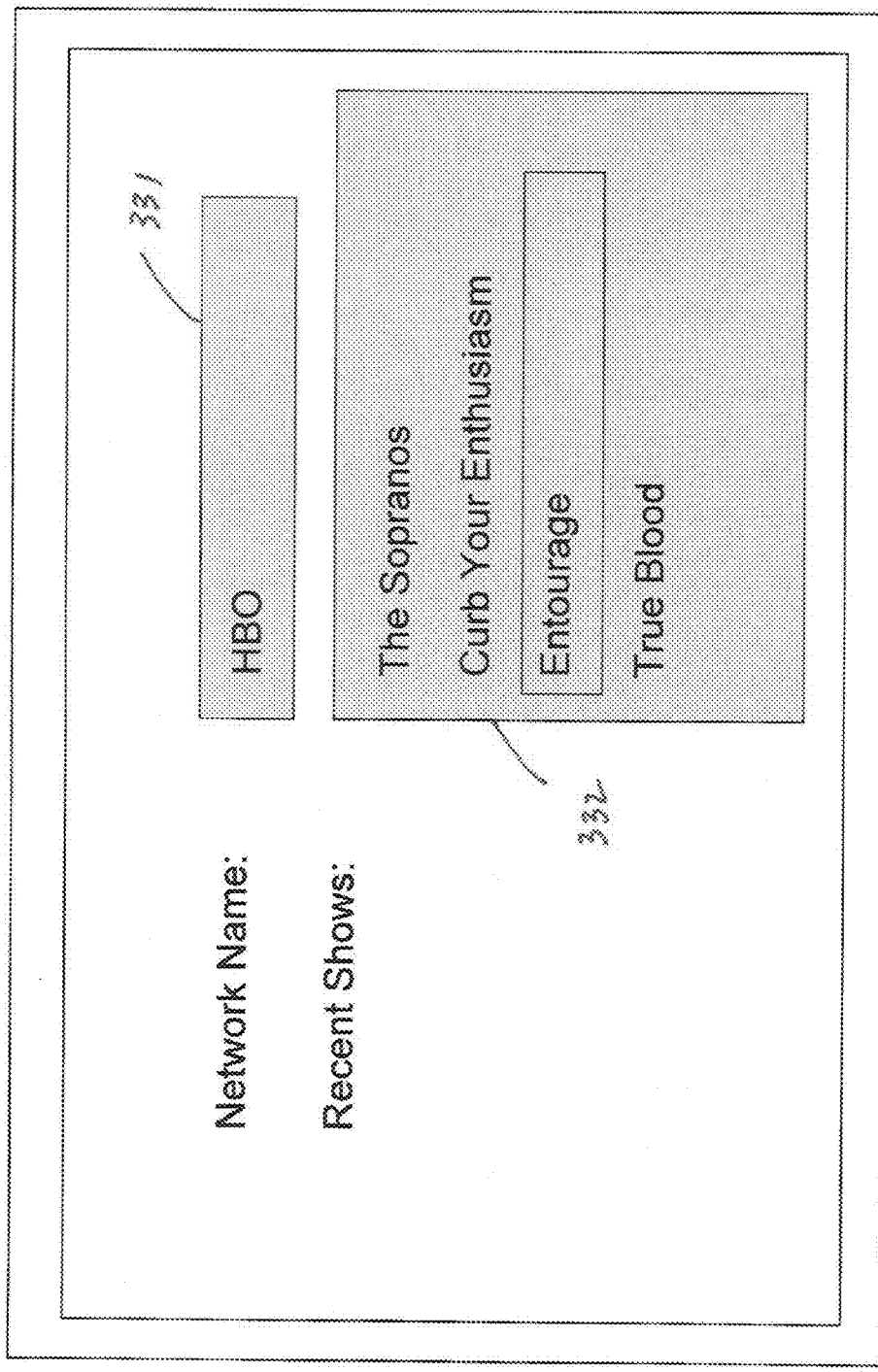
FIG. 6 shows a shows a search-by-network results screen display according to an exemplary embodiment of the present invention.
Figure 7:
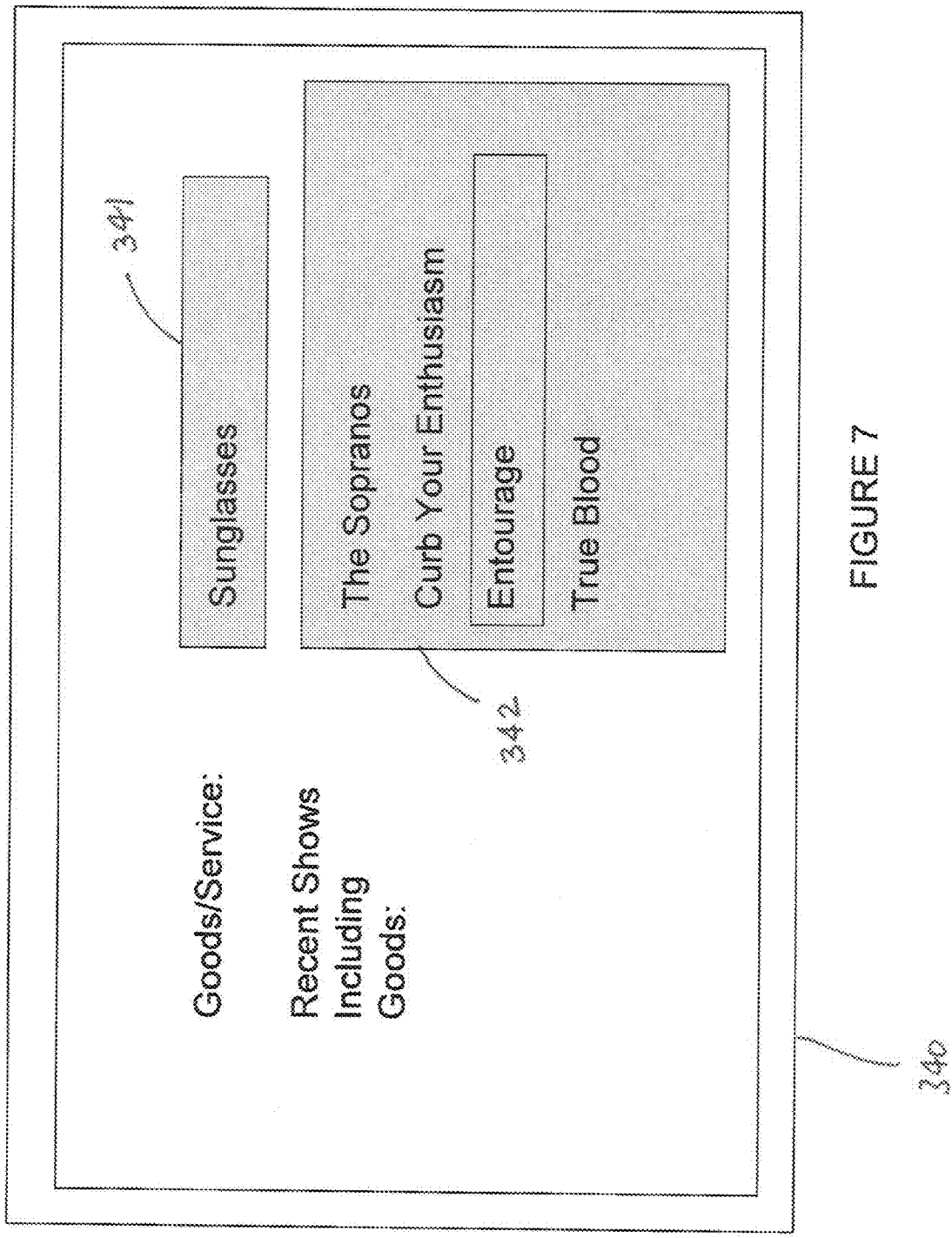
FIG. 7 shows a shows a search-by-goods/services results screen display according to an exemplary embodiment of the present invention.

FIG. 2 shows a method for obtaining goods and services 200 which includes a first step 201 of a user selecting a first search parameter. In the exemplary embodiment described herein this first search parameter may be program name (e.g., television show name or movie name), network (e.g., television network or movie house name), or by type of goods or services (e.g., jeans, sunglasses, dresses, etc.). FIG. 3 of the present application shows an exemplary main search screen display 300. The first search parameter narrows the search results to a first set which includes only those programs (e.g., television shows or movies) that meet the first parameter. For example, if the first search parameter is program name, and the user selects the television show "Gray's Anatomy," the search results will then include only episodes of that program. FIG. 4 of the present application shows an exemplary search-by-program results screen display for television 310 (where the show selected is "Entourage"). FIG. 5 of the present application shows an exemplary search-by-program results screen display for movies 320 (where the movie selected is "The Social Network"). FIG. 6 of the present application shows an exemplary search-by-network results screen display for television 330 (where the network selected is HBO). FIG. 7 of the present application shows an exemplary search-by-goods/services results screen display 340 (where the goods selected are sunglasses).

The second step 202 involves the user selecting a second search parameter. In the exemplary embodiment this second search parameter may be program date (e.g., the Feb. 17, 2010 showing of "Gray's Anatomy"), program location (e.g., the AMC Theater in Los Angeles), or program name (e.g., "Gray's Anatomy"). The second search parameter narrows the search results to a second set which includes only those programs (e.g., television shows or movies) that meet both the first search parameter and the second search parameter. Using the above example, if the user selects a program date of Feb. 17, 2010 as the second search parameter (having already selected the television show "Gray's Anatomy"), the search results will then include only episodes of that program occurring on that date.

Alternatively from using first and second search parameters provided sequentially, the first and second search parameters may be provided simultaneously on a single screen display. For example, the exemplary main search screen display 300 of FIG. 3 may also include additional search fields, such as program date, program location, or program name. In this way, if the user knows specific information on the television show or movie (e.g., program name and program date), he or she can proceed directly to a search result which includes only the specified program (as explained further below).

In another alternate embodiment, the initial search may be limited to television and movie programs occurring in the user's immediate area (as determined by your Zip Code, computer address, or other method know to those of ordinary skill in the art). For instance, Zip Code information may be provided by the user during the creation of a Login ID and/or Password for the website, as is common in the art. In this way, the search results are limited, and the method may only require the entry of a first search parameter. FIG. 5, for example, shows an exemplary search-by-program results screen display for movies 320, where the first search parameter is program name ("The Social Network") and the results are limited to showings of that movie in the user's area (in this case, the area in and around Philadelphia, Pa.). At this point, the user's search result has been limited to a single program (e.g., "The Social Network") and thus the user is ready to proceed to scene selection, as described below.

Figure 8:
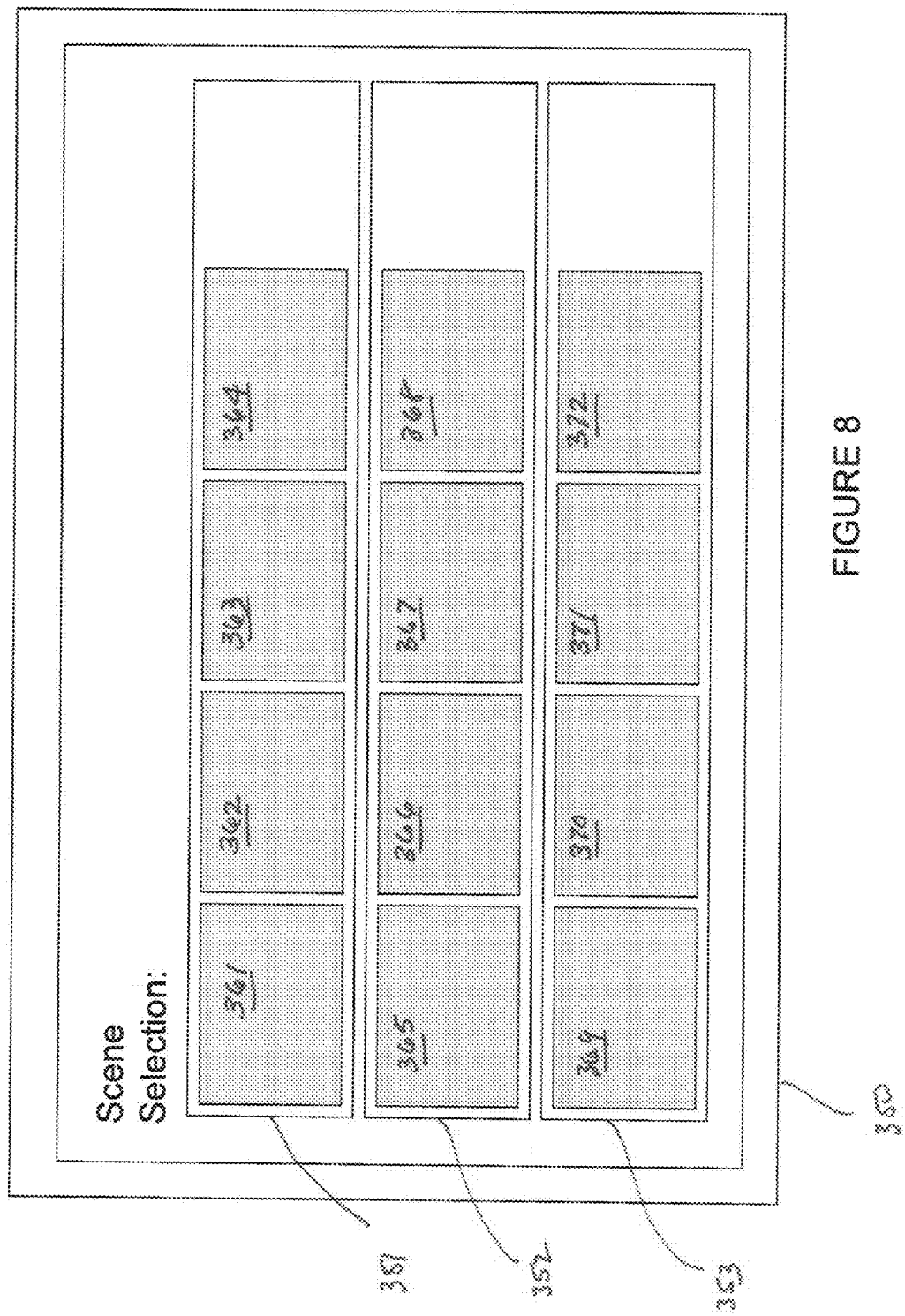
FIG. 8 shows a scene select screen display according to an exemplary embodiment of the present invention.

The third step 203 in the method 200 involves checking the search results to determine if the results have been limited to a single program (e.g., television show episode or movie showing). If the search results are limited to a single program, the method 200 proceeds to step 210 where the user is presented with a scene select screen display. FIG. 8 of the present application shows an exemplary scene select screen display 350. If the search results are not limited to a single program, the method 200 proceeds to step 204 where the user selects a single program from a list of programs. Using the example above, there may be multiple showings of "Gray's Anatomy" on Feb. 17, 2010, such that the user needs to select a particular showing at step 204. In another example, the user may be presented with a display screen showing four (4) episodes of "Gray's Anatomy" which match the search criteria "watch" for type of goods or services (first search parameter) and "Gray's Anatomy" for program name (second search parameter). In such an example, the display screen may display the name of each episode and the name of the watch (or watches) appearing in each episode, to allow the user to easily pinpoint the correct episode featuring the watch they are interested in purchasing. Once the user has made this selection, the method 200 proceeds to step 210 described above.

In step 210, the user is presented with images from the selected program from which products or services may be selected. In the exemplary embodiment, the user is presented with one or more video files, such as files in ".m4v," ".mov," or other video format known to those of ordinary skill in the art. For example, the program may be divided into one or more scenes or portions, so as to make parsing the program for products and services easier for the user. FIG. 8 shows an exemplary embodiment where the program is divided into twelve (12) scenes or video clips 361-372. Using the example above, a forty-eight (48) minute episode of "Gray's Anatomy" may be divided into twelve (12) scenes of approximately four (4) minutes each.

In step 211, the user selects a particular scene (e.g., scene 361) from the scene select screen display 350. The method 200 then determines whether any goods or services have been previously 'tagged' in the selected scene at step 212. This may be accomplished by, for example, sending a request to one or more of the databases 125, 126, 127, if such tagging information is stored there. As explained below, programs are 'tagged' prior to searching to identify products and services which may be purchased. If it is determined that no 'tagged' items exist in the selected scene, the user is presented with a message asking the user if they would like to request tagging for a particular product or service shown in the scene at step 213. If the user answers "yes," the user is presented with a selection box at step 214 which may be sized as appropriate to surround the product or service. If the user answers "no," the user is presented with the question "would you like to select a different scene?," or some similar language at step 220 which allows the user to return to step 211 and select another scene to determine whether any goods or services in the scene have been 'tagged.' If the user answers "yes" at step 220, the user is returned to step 211 for scene selection. If the user answers "no" at step 220, the user is returned to the main search screen display 300 at step 225.

If the user chooses to request tagging at step 213, and selects a product or service within the scene at step 214, the information is transmitted over the network 110 to one of the servers 120 for additional processing at step 215. For example, this information may be used to determine the product or service, for the purpose of adding a 'tag' to it later. The operators of the servers 120 (e.g., the persons running the website carrying out the method 200) may review this information and contact the producer of the television show or movie to determine the identity of the product or service for which tagging was requested by the user. The operators may then edit the scene to add the tag, so that future users will be able to identify the product or service without requesting tagging. In this way, the users assist the operators in improving the number of products or services which are 'tagged' in the scenes.

Figure 9:
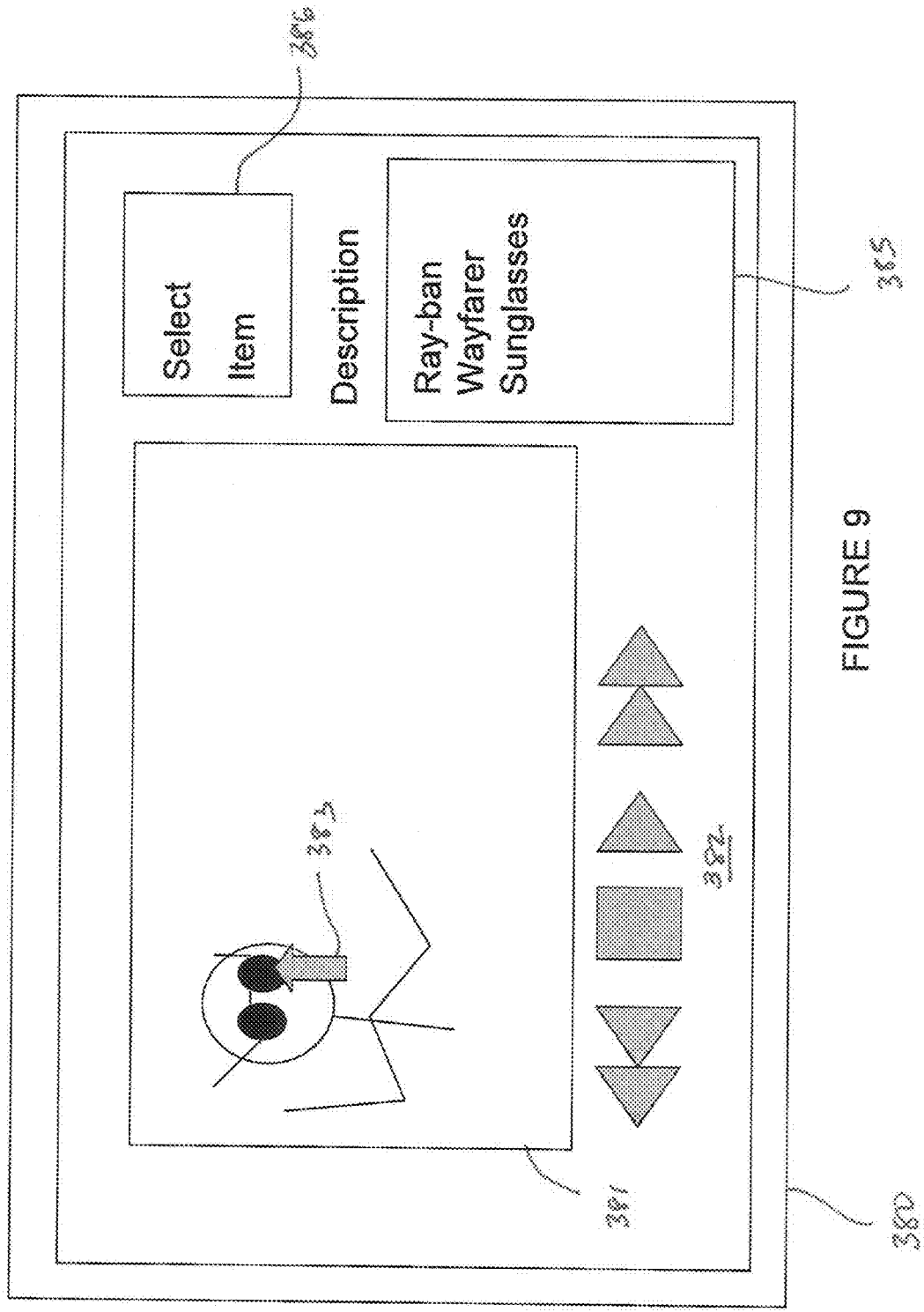
FIG. 9 shows a product select screen display according to an exemplary embodiment of the present invention.

If it is determined at step 212 that one or more goods or services have been 'tagged' in the selected scene, the user is presented with a product select screen display at step 230. FIG. 9 of the present application shows an exemplary product select screen display 380. The product select screen display 380 may include a window 381 for showing the scene, controls 382 for manipulating the scene (e.g., PLAY, PAUSE, FAST FORWARD, and REVERSE buttons) and a selection cursor 383, as are well known in the art. The product select screen display 380 may also include a product window 385 for displaying the name of the product or service over which the cursor is placed, and a selection button 386 for selecting the product or service. For example, if the scene includes a person wearing sunglasses, placing the selection cursor 383 over the sunglasses will cause the identification information for the sunglasses to be displayed in the product window 385. FIG. 9 shows an exemplary embodiment where the identification information is "Ray-ban Wayfarer Sunglasses." The selection cursor 383 may be configured so as to automatically display the product or service information in the product window 385 when the user 'rolls' the selection cursor over the product or service, may be configured such that the user must 'click' the cursor to make the product or service information appear, or in any other suitable manner known to those of ordinary skill in the art. If the user places the selection cursor 383 over a 'tagged' product or service and subsequently activates the selection button 386, the method 200 proceeds to step 240 as explained below.

Although not shown in FIG. 9, the product select screen display 380 may also include a separate window displaying all of the 'tagged' products and services in a particular video clip, so that the user can quickly determine whether the item they are after has been previously tagged. Such a listing of products and services may be divided by category in order to make it easier for the user to review, and may be automatically updated as the video clip is played (i.e., as products and services move in and out of the video clip).

Figure 10:
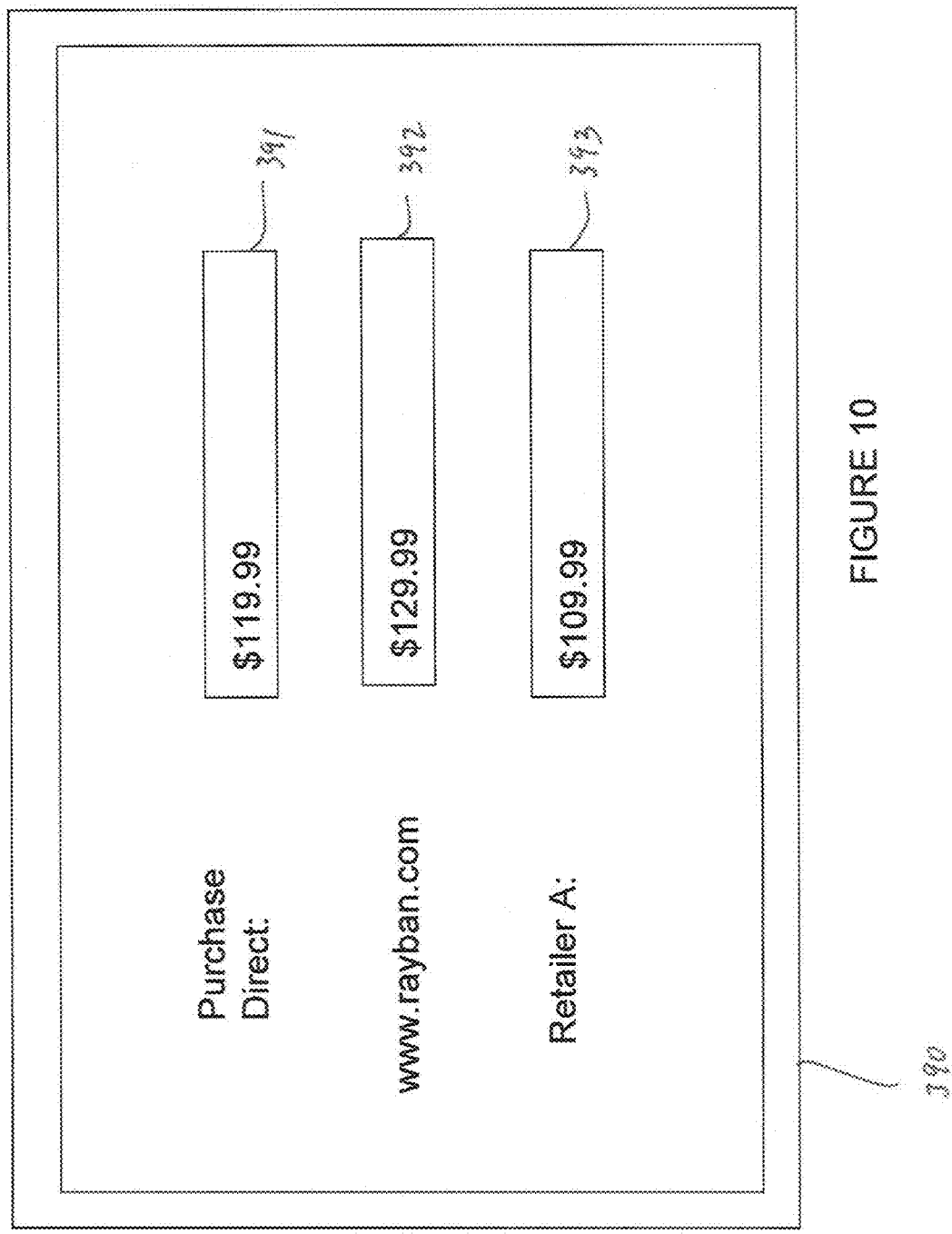
FIG. 10 shows a product purchase screen display according to an exemplary embodiment of the present invention.

In step 240 the user is presented with a product purchase screen display. FIG. 10 of the present application shows an exemplary product purchase screen display 390. The product purchase screen display 390 may include one or more fields, windows and/or portions of fields or windows for displaying purchasing information for the product or service selected. In the exemplary embodiment shown in FIG. 10, the product purchase screen display 390 shows three (3) potential vendors for the product selected (e.g., Ray-ban Wayfarer Sunglasses), along with pricing information. At this point, the user may select one of the vendors from which to purchase the selected product or service. The user may additionally be presented with one or more links to the vendor websites, so that he or she can consummate the purchase of the product or service immediately.

As described above, the method 200 according to an exemplary embodiment of the present invention takes a user from a program (e.g., television show or movie) directly to the product or service he or she wishes to purchase. The method 200 places the user in complete control of the purchasing process, and also permits the user to request 'tagging' of any products or services which have not been previously tagged for purchase.

FIG. 3 shows a main search screen display 300 according to an exemplary embodiment of the present invention. The main search screen display 300 may include one or more data entry fields 301, 302, 303 for allowing searching of television and movie programs. In the exemplary embodiment, a user may search the programs by title (field 301), network (field 302), and product/service (field 303).

FIG. 4 shows a search-by-program results screen display for television 310 according to an exemplary embodiment of the present invention. The search-by-program results screen display 310 may include one or more data results fields 311, 312 for displaying the results of the search performed on the main search screen display 300. In the exemplary embodiment, the results fields include program name (field 311) and recent showings of the program (field 312).

FIG. 5 shows a search-by-program results screen display for movies 320 according to an exemplary embodiment of the present invention. The search-by-program results screen display 320 may include one or more data results fields 321, 322 for displaying the results of the search performed on the main search screen display 300. In the exemplary embodiment, the results fields include program name (field 321) and recent showings of the program (field 322).

FIG. 6 shows a search-by-network results screen display for television 330 according to an exemplary embodiment of the present invention. The search-by-network results screen display 330 may include one or more data results fields 331, 332 for displaying the results of the search performed on the main search screen display 300. In the exemplary embodiment, the results fields include network name (field 331) and recent show on the network (field 332).

FIG. 7 shows a search-by-goods/services results screen display 340 according to an exemplary embodiment of the present invention. The search-by-goods/services results screen display 340 may include one or more data results fields 341, 342 for displaying the results of the search performed on the main search screen display 300. In the exemplary embodiment, the results fields include goods/services general name (field 341) and recent shows including goods/services (field 342).

FIG. 8 shows a scene select screen display 350 according to an exemplary embodiment of the present invention. The may include one or more sections 351, 352, 353 for displaying video of the selected program (e.g., television show or movie). In the exemplary embodiment, the scene select screen display 350 includes three (3) sections 351, 352, 353, each including four (4) scenes or video clips 361-372 of the selected program. As discussed above, the video clips 361-372 may be of any suitable length that allows easy browsing of the clips.

FIG. 9 shows a product select screen display 380 according to an exemplary embodiment of the present invention. The product select screen display 380 may include a window 381 for showing the scene selected on the scene select screen display 350, controls 382 for manipulating the scene (e.g., PLAY, PAUSE, FAST FORWARD, and REVERSE buttons) and a selection cursor 383, as are well known in the art. The product select screen display 380 may also include a product window 385 for displaying the name of the product or service over which the cursor 383 is placed, and a selection button 386 for selecting the product or service.

FIG. 10 shows a product purchase screen display 390 according to an exemplary embodiment of the present invention. The product purchase screen display 390 may include one or more data results fields 391, 392, 393 for displaying the results of the product selection performed on the product select screen display 380. In the exemplary embodiment, the results fields include three (3) purchase options: Purchase Direct From Website (field 391), Purchase From Manufacturer (field 392), Purchase From Third-Party Retailer (Field 393).

Now the 'tagging' process according to an exemplary embodiment of the present invention will be described. Before television shows and movies may be 'tagged,' research must be performed to determine the identity of one or more products appearing the in the programs. This identification process may be performed in many ways without departing from the scope of the present invention. For example, this identification process may be performed through communications with the producers, actors, directors or other personnel involved with the programs. The personnel responsible for wardrobe in particular will be in the best position to identify the clothing items worn in the programs, and other personnel (such as set designers) will be in the best position to identify the goods and services displayed during the programs. Such personnel may be induced to provide the relevant information used to identify the goods and services appearing in the programs through remuneration which is tied to actual sales of the goods and services, or through the routing of sales leads by the website carrying out the method 200.

Alternatively, the products and services may be identified independently of any contact with the personnel involved with the programs. For example, persons familiar with the fashion industry may be utilized to review the programs and identify clothing and other wearable items. The identity of these products could then be verified through an inspection of the website of the manufacturer, or through direct contact with the manufacturer. In reality, the personnel involved with the programs are likely to cooperate with the operators of the website carrying out the method 200, due to the promise of compensation and the additional publicity that the program will receive.

Once the products and services are identified as described above, the programs must be 'tagged.' In the exemplary embodiment, 'tagging' involves embedding one or more hyperlinks within the video associated with the program, such that the hyperlinks substantially overlie the product or service in question. In any particular scene there may be multiple embedded hyperlinks, depending upon the number of products or services shown in the scene. For example, if a scene includes two actors each wearing shirts, pants, sunglasses and watches, there may be eight (8) hyperlinks associated with the scene. As will be understood by those of ordinary skill in the art, as actors move in and out of scenes, some hyperlinks are added and some are removed. In this way, when the user places a selection cursor (e.g., selection cursor 383 in FIG. 9) over the product or service, the hyperlink becomes visible to the user, and a description of the product or service is displayed to the user in a separate window (e.g., product window 385 shown in FIG. 9). As described above, when the user selects the embedded hyperlink, he or she is directed to a website page for purchasing the product or service selected (e.g. product purchase screen display 390 shown in FIG. 10).

As discussed above, 'tagging' may also be performed on demand as part of the method 200. For obvious reasons, not all items within a particular scene may be able to be 'tagged,' either due to time or informational constraints, or because they are too because they are not visible for a long enough period to create a purchasing demand. The method 200 according allows the purchaser to request 'tagging' of any product or service shown in any television show or movie. To do this, the purchaser draws a window around the product or service using a selection cursor (as is well known in the art), and send the selection to the operators of the website carrying out the method 200. The operators then use their product identification techniques (e.g., communication with program personnel, independent identification) to identify the product and 'tag' it. In this way, the user of the website carrying out the method 200 are actually instrumental in improving its quality and effectiveness.

As an alternative to the above-described method using a centralized website to obtain goods and services, software may be included within an Internet-connected television for embedding hyperlinks in the images of available goods and services, so that the viewer may select the products on the television (potentially during a live broadcast), without need for a separate device (e.g., computer, iPhone, Blackberry, etc.). If the user selects a particular product or service during the broadcast, the software will generate a separate window to permit the immediate purchase of the product or service. For example, if while watching "Entourage" on HBO the viewer observes sunglasses on one of the characters that they want to purchase, they need only activate the software and point the cursor at the sunglasses. At this point, the hyperlink embedded in the image of the sunglasses is shown, and the viewer may select it to be routed to a webpage where the sunglasses may be purchased. The embedded hyperlinks would not be seen by the viewer during the broadcast unless the viewer chooses to activate the software and places the cursor over the product or service.

In summary, the present system and method permits a user to watch a television show or movie, and then proceed to a website where the method 200 according to an exemplary embodiment of the present invention is being carried out, search for the program, identify the good or service observed, and purchase the good or service directly. No other existing system or service provides this level of freedom and flexibility for the user. Further, by allowing users to 'tag' products which have not been previously 'tagged,' the system and method may be constantly improved through user interaction.

Although the invention has been described in terms of exemplary embodiments, it is not limited thereto. Rather, the appended claims should be construed broadly to include other variants and embodiments of the invention which may be made by those skilled in the art without departing from the scope and range of equivalents of the invention. This disclosure is intended to cover any adaptations or variations of the embodiments discussed herein.

What is claimed is:

1. A computer system comprising:
   at least one server computer; and,
   at least one client computer coupled to the at least one server computer through a network;
   wherein the at least one server computer includes at least one program stored thereon, said at least one program being capable of performing the following steps:
   receiving a first search parameter from a user stationed at the at least one client computer, said first search parameter comprising a type of goods or services;
   receiving a second search parameter from the user;
   calculating a search result based on the first and second search parameters;
   determining if a single television or movie program is specified by the search result;
   permitting the selection of at least one scene within the television or movie program, if a single television or movie program is specified by the search result;
   permitting the selection of at least one good or service within the at least one scene based on the type of goods or services previously searched; and,
   directing the user to a webpage including specific purchasing information for the at least one good or service.

2. The computer system of claim 1, wherein said at least one program is capable of performing the further step of:
   determining if the at least one good or service selected has been previously tagged; and,
   permitting the user to submit the at least one good or service for tagging if it has not been previously tagged.

3. The computer system of claim 2, wherein the step of determining if the at least one good or service selected has been previously tagged comprises determining if the at least one good or service is associated with a hyperlink.

4. The computer system of claim 1, wherein the second search parameter includes one selected from the group of: program date, program location, or program name.

5. The computer system of claim 1, wherein the step of calculating a search result based on the first and second search parameters comprises displaying one or more television programs to the user.

6. The computer system of claim 1, wherein the step of calculating a search result based on the first and second search parameters comprises displaying one or more movie programs to the user.

7. The computer system of claim 1, wherein said at least one program is capable of performing the further step of:
   permitting the selection of at least one television or movie program, if a single television or movie program is not specified by the search result; and,
   permitting the selection of at least one scene with the single television or movie program.

8. The computer system of claim 1, wherein the step of permitting the selection of at least one scene with the television or movie program comprises selection of at least one scene from a plurality of scenes, wherein the plurality of scenes comprise all the scenes of the television or movie program.

9. The computer system of claim 1, wherein the step of permitting the selection of at least one good or service within the at least one scene comprises permitting the user to place a first selection cursor over a good or service, and determining whether the good or service underlying the first selection cursor is associated with a hyperlink.

10. A computer-implemented method for obtaining goods and services shown in television and movie programs, the method comprising the steps of:
   receiving a first search parameter from a user stationed at a first computer, said first search parameter comprising a type of goods or services;
   receiving a second search parameter from the user;
   calculating a search result based on the first and second search parameters;
   determining if a single television or movie program is specified by the search result;
   permitting the selection of at least one scene with the television or movie program, if a single television or movie program is specified by the search result;
   permitting the selection of at least one good or service within the at least one scene based on the type of goods or services previously searched; and,
   directing the user to a webpage including specific purchasing information for the at least one good or service.

11. The computer-implemented method of claim 1, wherein the second search parameter includes one selected from the group of: program date, program location, or program name.

12. A non-transitory computer readable medium having embodied therein a computer program for processing by a machine, the computer program comprising:
- a first code segment for receiving a first search parameter from a user stationed at a first computer, said first search parameter comprising a type of goods or services;
- a second code segment for receiving a second search parameter from the user;
- a third code segment for calculating a search result based on the first and second search parameters;
- a fourth code segment for determining if a single television or movie program is specified by the search result;
- a fifth code segment for permitting the selection of at least one scene with the television or movie program, if a single television or movie program is specified by the search result;
- a sixth code segment for permitting the selection of at least one good or service within the at least one scene based on the type of goods or services previously searched; and,
- a seventh code segment for directing the user to a webpage including specific purchasing information for the at least one good or service.

13. The computer readable medium of claim 12, wherein the computer program further comprises:
- an eighth code segment for determining if the at least one good or service selected has been previously tagged; and,
- a ninth code segment permitting the user to submit the at least one good or service for tagging if it has not been previously tagged.

14. The computer readable medium of claim 12, wherein the second search parameter includes one selected from the group of: program date, program location, or program name.

15. A computer system comprising:
- at least one server computer; and,
- at least one client computer coupled to the at least one server computer through a network;
- wherein the at least one server computer includes at least one program stored thereon, said at least one program being capable of performing the following steps:
- receiving at least one search parameter from a user stationed at the at least one client computer, said search parameter comprising a type of goods or services;
- calculating a search result based on the at least one search parameter;
- determining if a single television or movie program is specified by the search result;
- allowing the user to select a single television or movie program, if a single television or movie program is specified by the search result;
- permitting the selection of at least one scene with the television or movie program;
- permitting the selection of at least one good or service within the at least one scene based on the type of goods or services previously searched; and,
- directing the user to a webpage including specific purchasing information for the at least one good or service.

* * * * *